(12) United States Patent
Nilsson

(10) Patent No.: US 6,754,481 B1
(45) Date of Patent: *Jun. 22, 2004

(54) WIRELESS PREPAID TELEPHONE SYSTEM WITH EXTENDED CAPABILITY

(76) Inventor: Byard G. Nilsson, 2064 Santa Margarita Dr., Fallbrook, CA (US) 92028

(*) Notice: Subject to any disclaimer, the term of this patent is extended or adjusted under 35 U.S.C. 154(b) by 355 days.

This patent is subject to a terminal disclaimer.

(21) Appl. No.: 09/814,537

(22) Filed: Mar. 21, 2001

Related U.S. Application Data

(63) Continuation of application No. 08/955,338, filed on Oct. 21, 1997, which is a continuation-in-part of application No. 08/878,864, filed on Jun. 19, 1997, now Pat. No. 6,049,710.

(51) Int. Cl.[7] .................................................. H04Q 7/20
(52) U.S. Cl. ...................................... 455/406; 455/563
(58) Field of Search ................................ 455/405, 406, 455/407, 408, 414, 563

(56) References Cited

U.S. PATENT DOCUMENTS

| | | |
|---|---|---|
| 3,688,126 A | 8/1972 | Klein |
| 4,007,364 A | 2/1977 | Ojima et al. |
| 4,320,256 A | 3/1982 | Freeman |
| 4,475,189 A | 10/1984 | Herr et al. |
| 4,596,900 A | 6/1986 | Jackson |
| 4,611,094 A | 9/1986 | Asmuth et al. |
| 4,731,811 A | 3/1988 | Dubus |
| 4,829,514 A | 5/1989 | Frimmel |
| 4,856,066 A | 8/1989 | Lemelson |
| 4,870,686 A | 9/1989 | Gerson et al. |
| 4,879,744 A | 11/1989 | Tasaki et al. |
| 4,969,180 A | 11/1990 | Watterson et al. |
| 5,042,063 A | 8/1991 | Sakanishi et al. |
| 5,153,902 A | 10/1992 | Buhl et al. |
| 5,195,090 A | 3/1993 | Bolliger et al. |
| 5,203,009 A | 4/1993 | Bogusz et al. .............. 455/33.1 |
| 5,222,121 A | 6/1993 | Shimada |
| 5,272,747 A * | 12/1993 | Meads ......................... 455/407 |
| 5,274,695 A | 12/1993 | Green |
| 5,297,183 A | 3/1994 | Bareis et al. |
| 5,297,194 A | 3/1994 | Hunt et al. |
| 5,353,335 A | 10/1994 | D'Urso et al. |
| 5,353,336 A | 10/1994 | Hou et al. ................... 270/354 |
| 5,369,685 A | 11/1994 | Kero |

(List continued on next page.)

FOREIGN PATENT DOCUMENTS

| | | |
|---|---|---|
| WO | WO 96/03001 | 2/1996 |
| WO | WO 99/14928 | 3/1999 |

OTHER PUBLICATIONS

Gawrys, G.W., et al., "A New Protocol for Call Handling Functions for the SPC Network," Globecom '82, IEEE Global Telecommunications Conference, Conference Record vol. 2 of 3, Miami, Nov. 29 to Dec. 2, 1982, pp. 735–738.

Dorros, Irwin, "Evolving Capabilities of the Public Switched Telecommunications Network," Business Communications Review, Jan.–Feb. 1981, pp. 4–11.

*Primary Examiner*—Quochien B. Vuong
*Assistant Examiner*—Nick Corsaro

(57) ABSTRACT

A telecommunication system incorporates individual station instruments simplified by wireless operation, voice dialing, prepaid accounting and out-call operation, all enabled by cooperative system operation including supporting central equipment. Wireless operation of the central equipment involves a multiple port wireless platform along with other units for interfacing a multitude of mobile station instruments simultaneously for interactive audio communication to, regulate control, monitor and record operations of the instruments, and bridge communication with selected remote terminals through the public switched telephone network. Message capability, emergency abort to an operator station and security features supplement the basic system.

16 Claims, 8 Drawing Sheets

U.S. PATENT DOCUMENTS

| | | | |
|---|---|---|---|
| 5,377,256 A | | 12/1994 | Franklin et al. |
| 5,420,912 A | | 5/1995 | Kopp |
| 5,440,620 A | | 8/1995 | Slusky |
| 5,450,479 A | | 9/1995 | Alesio et al. |
| 5,461,664 A | | 10/1995 | Cappadona |
| 5,485,505 A | | 1/1996 | Norman et al. |
| 5,499,288 A | | 3/1996 | Hunt et al. |
| 5,509,049 A | | 4/1996 | Peterson ..................... 379/58 |
| 5,509,060 A | | 4/1996 | Hall et al. ............. 379/207.02 |
| 5,541,977 A | | 7/1996 | Hodges et al. |
| 5,574,771 A | | 11/1996 | Driessen et al. |
| 5,592,535 A | | 1/1997 | Klotz ......................... 379/58 |
| 5,599,204 A | | 2/1997 | Glassford ................. 439/502 |
| 5,602,900 A | | 2/1997 | Hattori |
| 5,640,689 A | | 6/1997 | Rossi ......................... 455/89 |
| 5,652,789 A | | 7/1997 | Miner et al. |
| 5,659,597 A | | 8/1997 | Bareis et al. |
| 5,710,813 A | | 1/1998 | Terui |
| 5,719,926 A | | 2/1998 | Hill |
| 5,722,067 A | * | 2/1998 | Fougnies et al. ........... 455/406 |
| 5,754,645 A | | 5/1998 | Metroka et al. |
| 5,778,313 A | * | 7/1998 | Fougnies ................... 455/406 |
| 5,790,636 A | | 8/1998 | Marshall |
| 5,797,101 A | | 8/1998 | Osmani et al. |
| 5,802,466 A | | 9/1998 | Gallant |
| 5,812,945 A | | 9/1998 | Hansen et al. |
| 5,815,807 A | | 9/1998 | Osmani et al. |
| 5,818,915 A | | 10/1998 | Hayes, Jr. et al. |
| 5,826,185 A | | 10/1998 | Wise |
| 5,828,738 A | | 10/1998 | Spaeth |
| 5,832,371 A | | 11/1998 | Thornton |
| 5,835,570 A | | 11/1998 | Wattenbarger |
| 5,839,058 A | | 11/1998 | Phillips et al. |
| 5,845,218 A | | 12/1998 | Altschul |
| 5,850,599 A | | 12/1998 | Seiderman |
| 5,854,975 A | * | 12/1998 | Fougnies et al. ........... 455/408 |
| 5,867,796 A | | 2/1999 | Inutsuka |
| 5,870,459 A | | 2/1999 | Phillips et al. |
| 5,884,188 A | | 3/1999 | Hayes |
| 5,946,613 A | | 8/1999 | Hayes, Jr. et al. .......... 455/406 |
| 5,963,859 A | | 10/1999 | Keating |
| 5,966,654 A | | 10/1999 | Croughwell et al. |
| 5,991,615 A | * | 11/1999 | Coppinger et al. ......... 455/406 |
| 5,995,822 A | * | 11/1999 | Smith et al. ............... 455/406 |
| 5,995,926 A | | 11/1999 | Gupta et al. |
| 6,049,710 A | * | 4/2000 | Nilsson ..................... 455/409 |
| 6,085,080 A | | 7/2000 | Rahikainen et al. |
| 6,138,036 A | | 10/2000 | O'Cinneide |
| 6,149,353 A | | 11/2000 | Nilsson |
| 6,154,526 A | | 11/2000 | Dahlke |
| 6,157,848 A | | 12/2000 | Bareis et al. |
| 6,167,118 A | | 12/2000 | Slivensky |
| 6,167,251 A | | 12/2000 | Segal et al. |
| 6,198,947 B1 | | 3/2001 | Barber ..................... 379/88.02 |
| 6,226,532 B1 | | 5/2001 | Kim et al. |
| 6,243,596 B1 | | 6/2001 | Kikinis |
| 6,292,675 B1 | | 9/2001 | Nilsson |
| 6,298,250 B1 | | 10/2001 | Nilsson |
| 6,308,053 B1 | | 10/2001 | Nilsson |
| 6,393,304 B1 | | 5/2002 | Meche ................. 379/355.02 |
| 6,400,967 B1 | | 6/2002 | Nilsson |
| 6,400,969 B1 | | 6/2002 | Yamashita et al. |
| 6,405,029 B1 | | 6/2002 | Nilsson |
| 6,418,328 B1 | | 7/2002 | Shon ..................... 379/355.09 |
| 6,473,610 B1 | | 10/2002 | Nilsson |

* cited by examiner

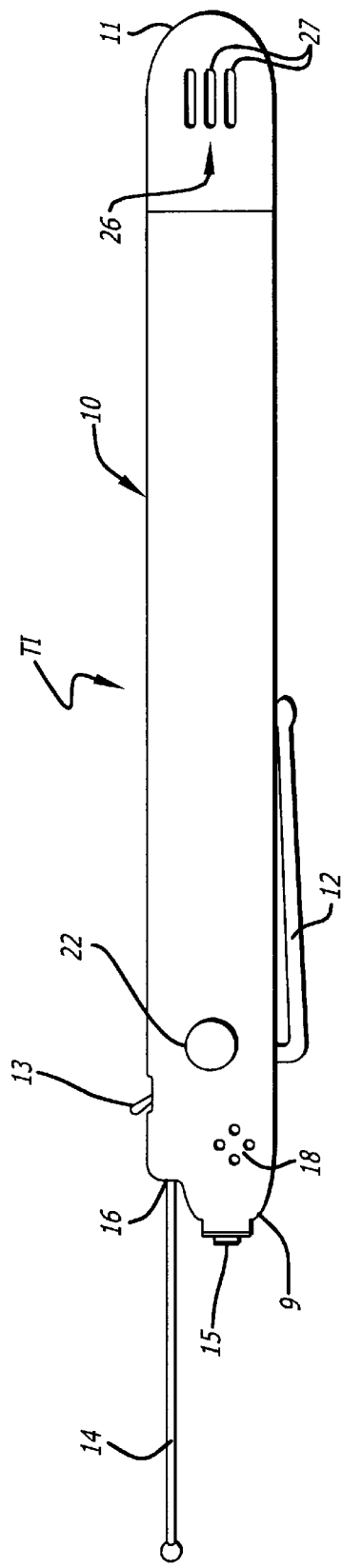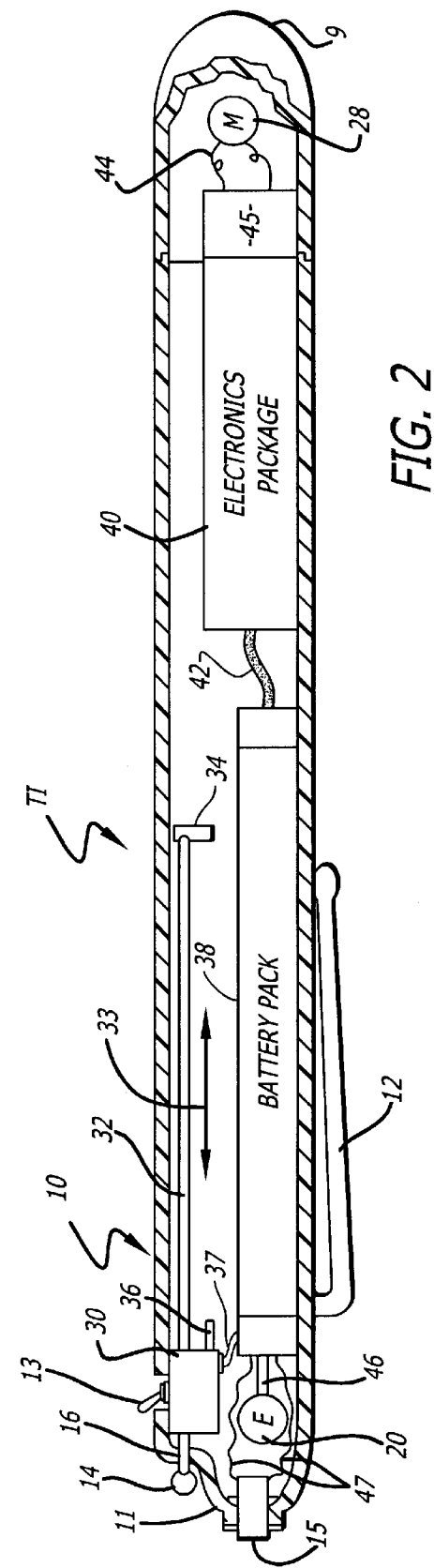

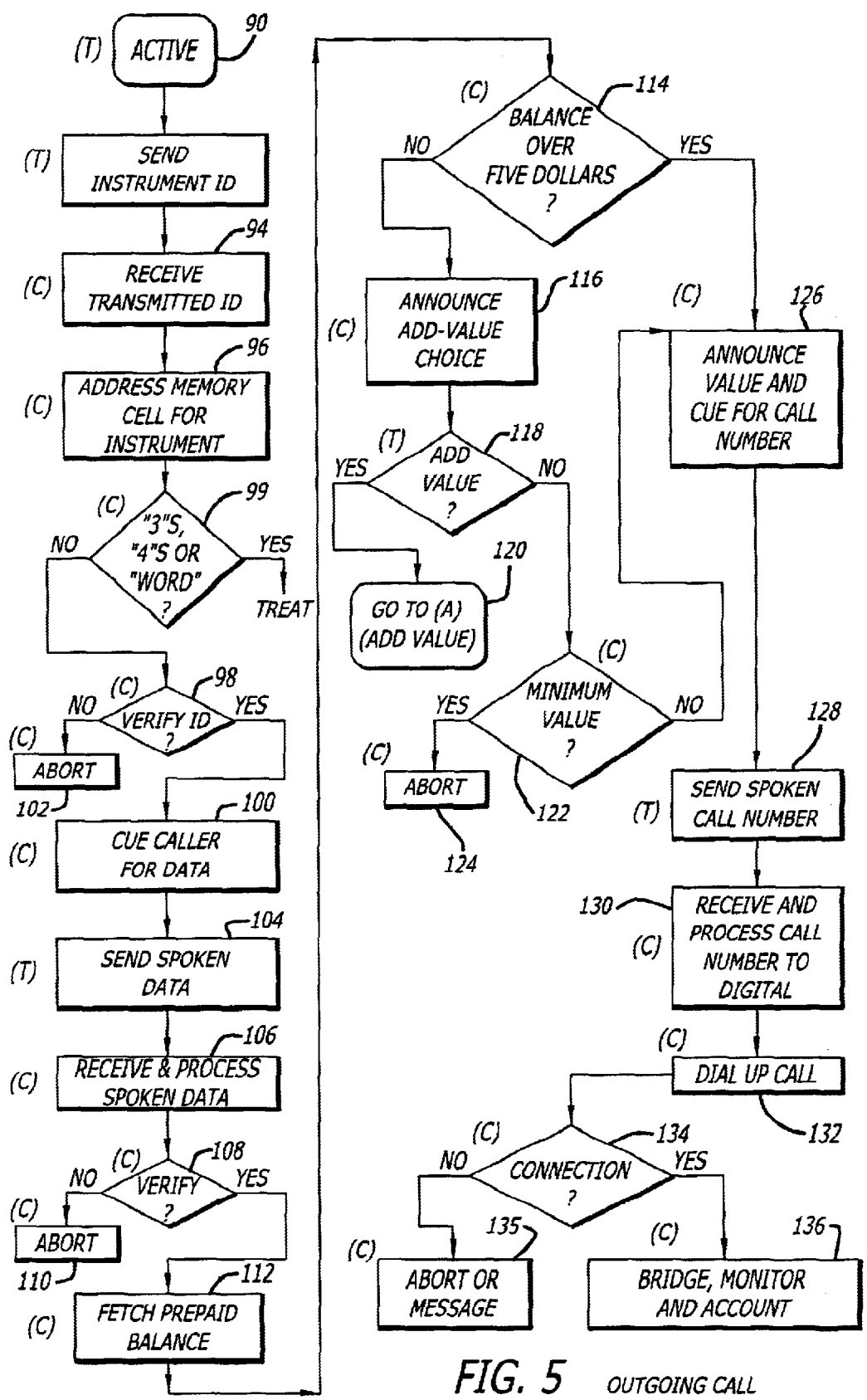
FIG. 5  OUTGOING CALL

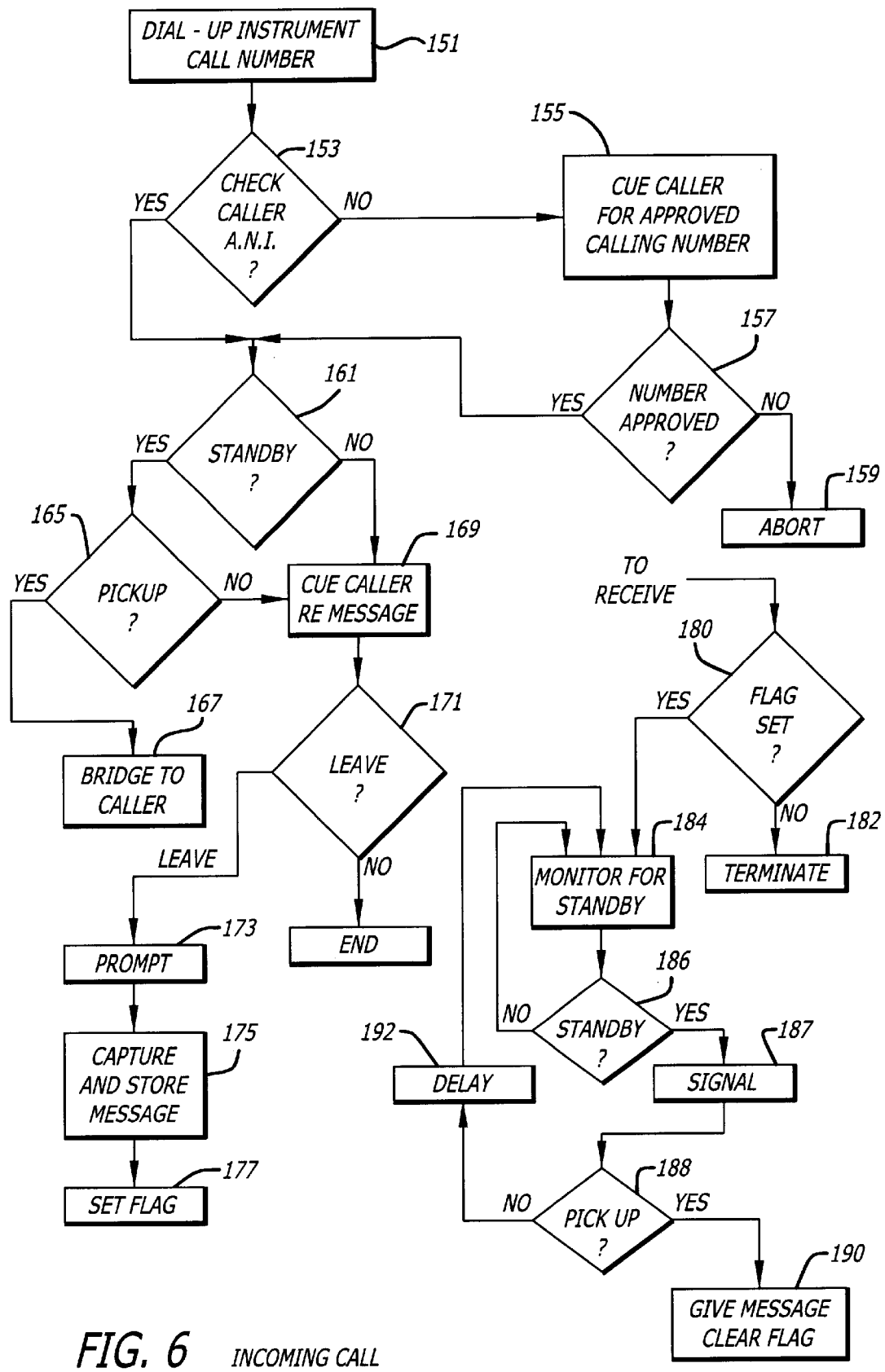
FIG. 6   INCOMING CALL

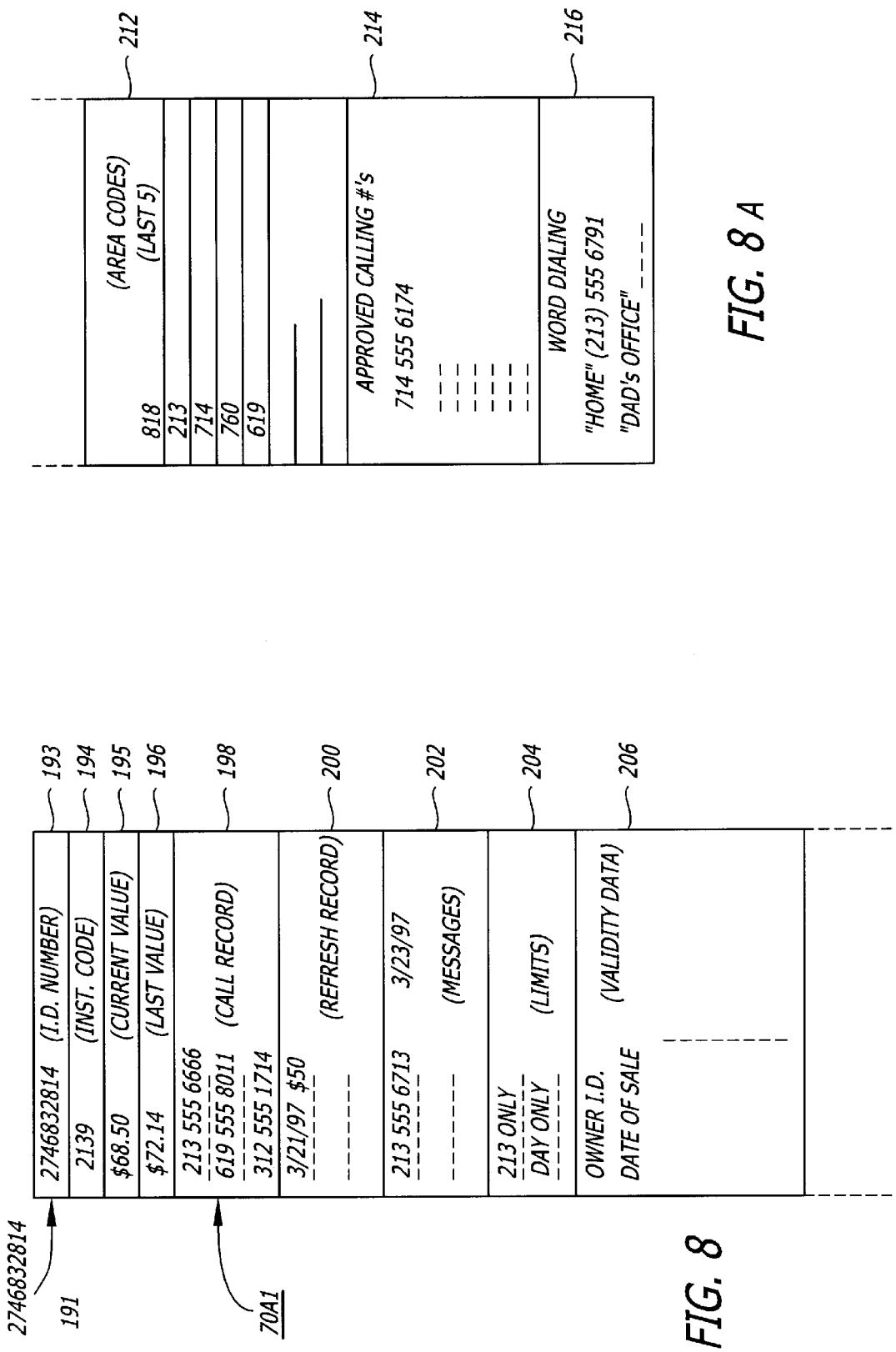

WIRELESS PREPAID TELEPHONE SYSTEM WITH EXTENDED CAPABILITY

RELATED APPLICATION INFORMATION

This application is a continuation of application Ser. No. 08/955,338 filed Oct. 21, 1997, entitled "Wireless Prepaid Telephone System With Extended Capability," which is a continuation in part of application Ser. No. 08/878,864 filed Jun. 19, 1997, now U.S. Pat. No. 6,049,710 entitled "Wireless Prepaid Telephone System With Dispensable Instruments," hereby incorporated by reference as if set forth fully herein.

BACKGROUND OF THE INVENTION (1) Field of the Invention

The present invention relates to mobile telecommunication and more specifically to wireless prepaid telephone systems including telephone instruments capable of being compact, inexpensive and simple as a result of operation in combination with enhanced central station equipment. In the context of wireless operation, various cooperative features are provided.

(2) Background Description

In recent years, considerable progress has been made in the field of wireless telephone systems. In that regard, wireless telephone instruments, sometimes called "mobile stations" (MS) have come into widespread use, for example, accommodated by geographically defined cells. Although the systems are quite effective, and have considerably enhanced telephone communication, areas for improvement continue to exist.

Typically in wireless systems, individual telephone instruments communicate at an initial level with central equipment, sometimes called "base stations" (BS). Operating with other components as a composite system, the geographically-separate base stations enable mobile telephone instruments to roam through different geographic areas or cells. Thus, from various locations, mobile instruments can access virtually any telephone terminal throughout the entire dial-up telephone network, sometimes called the "public switched telephone network" (PSTN), and in the course of a call to roam freely from one cell to another.

Traditionally, a composite mobile telecommunications system includes some form of a switching system, sometimes including a unit called a "mobile switching center" (MSC). The MSC may be provided, along with other structure between a base station (BS) and the public switched telephone network (PSTN). Accordingly, conventional mobile management is accomplished using well known techniques and structures. However, it is noted that radical system changes are in progress to expand and improve the systems.

In contemporary systems, individual wireless telephone instruments typically are purchased by users in a transaction that is somewhat complex. As part of the purchase transaction, the instrument is activated and numbers are assigned. However, more significantly, a financial commitment must be established for the new owner. Of course, the owner is responsible for the telephone instrument itself, however, responsibility also extends to the telephone service provided for the instrument, e.g. calls charged to the instrument.

Generally, wireless instruments are susceptible to loss or theft and inherently involve an increased exposure resulting from illicit use. While adjustments may be made in the billing for such calls, usually such adjustments are not made without the expense of time and aggravation to instrument owner. Thus, the risk of physical loss presents a nagging annoyance to wireless instrument owners.

Concern over the risk of loosing a wireless telephone instrument is compounded by the fact that wireless operation exposes critical information that can be obtained without physical access to a telephone instrument. When obtained, such information can be used to charge fraudulent calls to a wireless owner's account. Consequently, even when an instrument never leaves an owners control, the owner may be invoiced for calls fraudulently made from a cloned instrument.

As other considerations, wireless telephone instruments ideally could be of a more convenient size, have a lower cost, involve simpler procurement procedures, and have a defined risk of loss.

Furthermore, as has been previously proposed, wireless telephone instruments can function in a pager or message format. However, a need exists for expanded message capabilities. Also with regard to wireless telephone instruments, wrong numbers are particularly annoying. Call screening and expedient coupling also take on entirely different perspective in the wireless field.

SUMMARY OF THE INVENTION

To some extent, the present invention is based on recognizing certain distinct aspects of wireless telephones. The very nature of wireless telephone instruments renders them more susceptible to misplacement, loss and theft. Also, wireless telephone instruments tend to be more personal. That is, a large fraction of these instruments are used almost exclusively by only one, or at most two persons. Widespread use of a single instrument by several persons is quite unusual.

Furthermore, in part, the present invention is based on recognizing that a very simple and convenient, yet effective, wireless telephone instrument can be accommodated, by operating such instruments cooperatively with a central system that performs functions that have traditionally been executed by telephone instruments.

Generally, in accordance with a disclosed embodiment hereof, a convenient, inexpensive, voice-actuated, prepaid, wireless telephone instrument is provided, that involves limited complications, along with limited risk and exposure for owners and possessing expanded communication capabilities. Also, expanded message formats, call selectivity, screening and routing operations are available along with locator or tracking capabilities. Furthermore, in accordance herewith, capabilities may be incorporated to easily and effectively accomplish certain communications as in cases of emergency or for control functions. Certain aspects of communication also can be restricted to a single user of an instrument.

Basically, in accordance with the present invention a wireless telephone instrument consists essentially of an earphone, a microphone, a radio transceiver, a battery pack and a control unit (with memory, switching and signaling capabilities) all embodied in a small convenient housing.

As disclosed herein, wireless telephone instruments operate as part of a composite system in cooperation with a central station having a multiple-port platform. The ports of the platform accommodate multiple wireless (and other) telephone instruments simultaneously, to variously access any of a variety of programs and ultimately remote terminals.

In a disclosed embodiment, for outgoing calls, the users of wireless telephone instruments are prompted vocally to speak numerical control words as well as message words. For example, spoken words may indicate routing or control signals as well as audio communication. Thus, communication by users at wireless telephone instruments, is in the form of voice signals generated from the user's voice and variously interpreted and used at the central station depending on form and conditions. Individual user voices also can be "signaturized" to control use of a specific instrument.

At a central station, certain numerical voice signals are recognized as digits, e.g. digits "zero" through "nine", by a voice recognition unit and consequently are converted to a dialing form (DTMF or digital) for control, dial-up or routing functions. Words also may be assigned for indicating telephone star (or asterisk "*") and pound sign ("#") signals as they are generated using a traditional telephone keypad. Single non-numerical words, e.g. "home" also may be recognized to command a specific call number, and words, as spoken by authorized users may serve to verify proper use.

Essentially, the central station system portion of the total system may include a voice generator, e.g. an audio response unit (ARU), a voice recognition unit, e.g. minimally with "number" or numerical recognition capability, and a control unit incorporating a memory as for storing prepaid values and instrument data, all effectively coupled for operation with a wireless telephone platform to accommodate incoming and outgoing communications that include various message forms as well as vocal communication.

In accordance with an embodiment of the present invention, the central station platform interfaces individual remote wireless telephone instruments as well as traditional telephone terminals to accomplish various communication objectives. Voice cues or sound signals prompt the user of the wireless instruments to provide vocalized numerals (audio) that are received, as in combinations, to indicate various desired objectives. Dial-up or routing signals may be generated to accomplish: a desired terminal connection, identification, authentication or verification, for example to assure that a remote instrument is being properly used. Special communications may be indicated by expressing numerals vocally, as to communicate select messages, request an operator, indicate an emergency, or obtain information.

Generally, for ordinary outgoing calls, if data from a wireless telephone instrument is determined to be proper, then in a prepaid mode, the central station determines whether the instrument has adequate pre-paid value to cover a call. If so, the indicated communication may be completed through the associated mobile network and a public network, which might take any of a variety of forms. If charges are levied on the wireless instrument for incoming calls, similar tests may be performed along with screening operations.

With reference to current technology, the system elements of the central station as disclosed herein may be variously embodied in a mobile network, as by supplementing and modifying a base station and/or mobile switch center. Accordingly, the system hereof may be variously incorporated in traditional or future mobile telecommunications systems to accommodate various features and improvements hereof.

The basic simplicity of instruments in accordance herewith enable very compact forms, as in the configuration of a fountain pen. Furthermore, in large production runs, individual instruments may be quite inexpensive, even to the extent of being discardable or disposable when the original pre-paid value has been consumed.

In summary, in accordance herewith, convenient, inexpensive and effective instruments may be distributed with defined and relatively small risk, as in the event of loss. Complications and obligations of ownership also may be relatively few. Various modifications are disclosed to accommodate various alternative structures and processes as well as various communications to accommodate messages, location information and emergency data.

BRIEF DESCRIPTION OF THE DRAWINGS

In the drawings, which constitute a part of this specification, exemplary embodiments of the invention are set forth as follows:

FIG. 1 is a side view showing a wireless mobile telephone instrument in accordance with the present invention and for use in a system in accordance with the present invention;

FIG. 2 is a sectional view taken lengthwise through the instrument of FIG. 1;

FIGS. 5 and 5A are related flow charts detailing certain operations of the system as depicted in FIG. 3;

FIG. 6 is a flow chart detailing other operations of the system of FIG. 3;

FIGS. 8 and 8A are symbolic diagrams of a memory cell in the system of FIG. 3, for representing data on a wireless telephone instrument in accordance herewith.

DESCRIPTION OF THE PREFERRED EMBODIMENT

Figure 3:
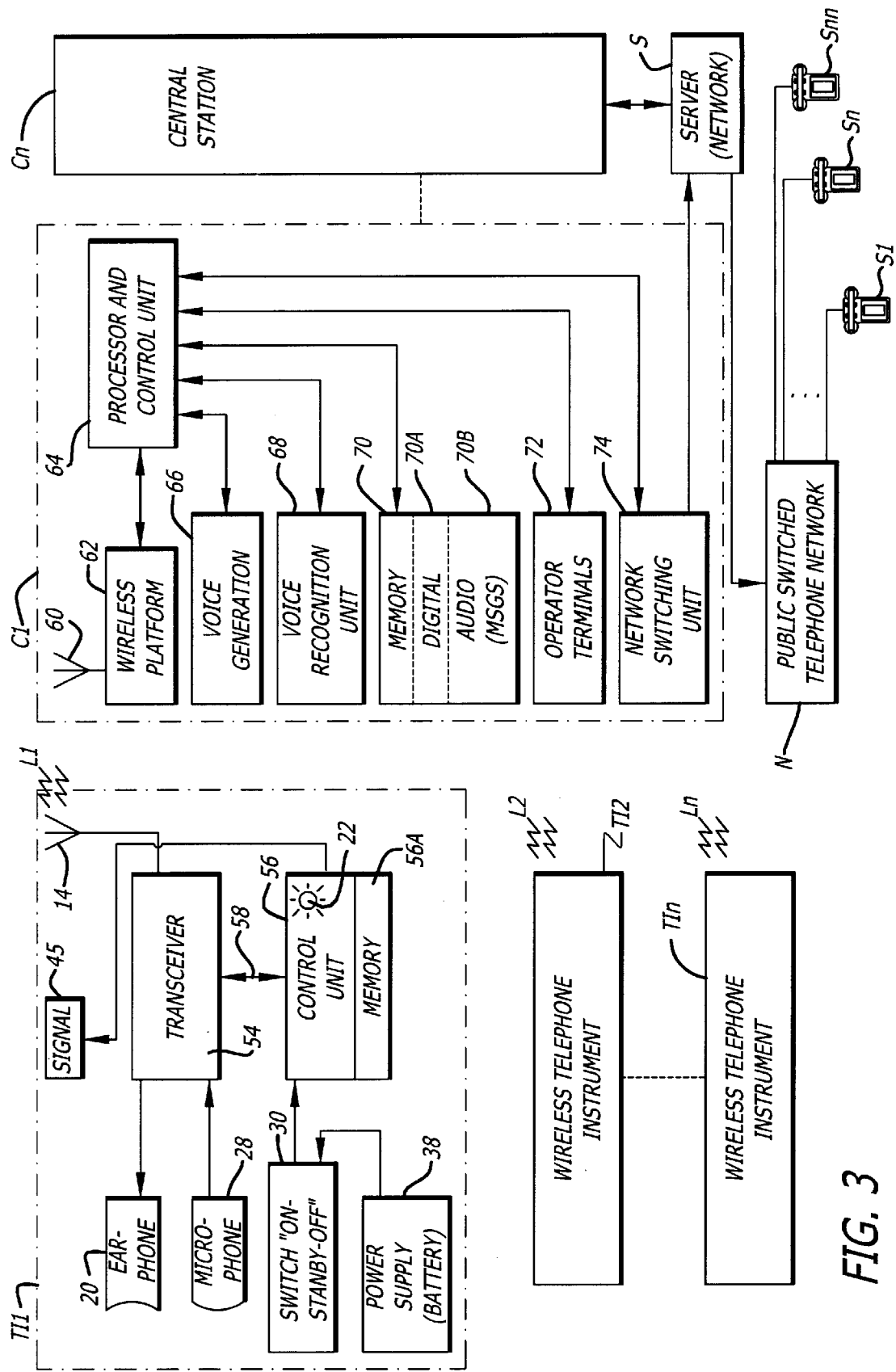
FIG. 3 is a block diagram of a system in accordance with the present invention, showing components of telephone instruments and central station components for use with a public switched telephone network.

As indicated above, detailed embodiments of the present invention are disclosed herein. However, the embodiments are merely representative, recognizing that a wide variety of alternative embodiments are possible utilizing a multitude of different techniques and components variously distributed and located. Nevertheless, the disclosed embodiments are deemed to afford the best embodiments for purposes of disclosure and to provide a basis for the claims herein which define the scope of the present invention.

Referring initially to FIG. 1, a mobile station, or wireless telephone instrument TI is depicted showing some exterior components. Specifically, the instrument TI is embodied in a tubular housing 10 with somewhat hemispherical ends 9 (left) and 11 (right) to define a configuration that is somewhat similar to that of a writing instrument, e.g. a fountain pen.

Near the end 9 of the housing 10, a pocket clip 12 is affixed to extend parallel to the central axis of the housing 10. The clip 12 may serve as a handle and accommodates convenient attachment of the instrument TI during storage. Note that the pocket clip 12 may be variously placed radially to attain the most universally convenient location for use as a handle.

Also apparent from the exterior of the instrument TI is an antenna 14 (FIG. 1, upper left) which is telescopically mounted either to be substantially contained in the housing 10 or to extend through a port 16, so that its major length is outside the housing 10. Note that in FIG. 1, the antenna 14 is shown partially extended from the housing 10 while in FIG. 2, it is shown retracted.

Near the antenna 14 is a manual on-off switch 13 which functions in conjunction with the structure of the antenna 14 to set each of four possible states for the instrument TI, specifically: "active", "standby" "pager" or "off" as described in detail below.

Also, near the antenna port 16 (FIG. 1) at the very tip of the end 9, is a receptacle 15 for a jack (not shown) to recharge the instrument. Somewhat adjacent the receptacle 15, an array of small openings 18 penetrate the housing 10 for passing sound from an earphone 20 (FIG. 2, top).

Mounted near the array of openings 18 is a pilot lamp 22 to indicate the position of the switch 13, and which is illuminated during the states "active" and "pager". The individual states are further indicated by the position of the antenna 14. Thus, a switching structure for setting the four states involve the antenna 14 and the switch 13, as described below with reference to FIG. 2.

Near the end 11 (FIG. 1, right) a group 26 of slots 27 penetrate the housing 10 for passing a users voice sounds to a microphone 28 (FIG. 2, bottom). Thus, the instrument TI is configured to position the microphone 28 near a user's mouth while the earphone 20 is positioned near the user's ear. The elemental simplicity and convenience of the instrument TI are apparent, both for storage and use.

The earphone 20 (FIG. 2, upper right) and the microphone 28, mentioned above, are firmly fixed within the housing 10. Also fixed in the housing 12 is a switch device 30 (upper right) configured as a small block. The switch device 30 supports both the antenna 14 and the switch 13. It is involved in setting the state of the instrument TI. Structurally, the switch device 30 defines a small bore (not shown) that telescopically receives an elongate shaft 32 of the antenna 14. Accordingly, the switch device 30 provides a slide bearing to accommodate axial movement of the antenna 14 as indicated by an arrow 33.

When the antenna 14 is withdrawn to extend fully from the housing 10, a knob 34, located at the inner end of the antenna 14, engages a spring-biased plunger 36 extending from the switch device 30. The knob 34 forces the plunger 36 telescopically within the switch device 30. Note that forms of plunger switch devices, as embodied in the antenna switch structure 30, are well known and widely used. In that regard, retraction of the antenna 14 releases the spring-biased plunger 36 allowing it to return to the exposed position (off) as illustrated (FIG. 2). Essentially, a control unit embodied in the switch device 30 decodes the two binary positions of the members (switch 30 and antenna 14, FIG. 1) selectively to set the individual four states. Specifically, the operational states of the instrument TI are attained as follows:

| STATE | DESIGNATION | SWITCHING |
| --- | --- | --- |
| "off" | C1 | antenna 14 in, switch 11 "off" (no operations) |
| "pager" | C2 | antenna 14 in, switch 11 "on" (traditional pager operation) |
| "stdby" | C3 | antenna 14 out, switch 11 "off" (receive incoming calls) |

| STATE | DESIGNATION | SWITCHING |
| --- | --- | --- |
| "active" | C4 | antenna 14 out, switch 11 "on" (outgoing call mode or call in progress) |

The states are signal indicated, as by a simple truth-table decoder, and are transmitted as by signal representations to the central station for control use. Note that the "off" state coincides to a "no signal" state.

As indicated above, except for the antenna 14, the internal components of the wireless telephone instrument TI are firmly fixed in the housing 10. In such fixed locations, the components are electrically interconnected to accomplish an operating electrical apparatus as described in detail below. Specifically, the switch device 30, along with the antenna 14 are coupled by a cable 37 to a battery pack 38 which also is connected by a cable 42 to an electronics package 40, including a tone signal or buzzer 45 for commanding attention to the instrument. Connections from the electronics package 40 also extend to the microphone 28 (wires 44) and to the earphone 20 (wires 46, partly obscured by the battery pack 38 and carried in the cable 42). The battery pack 38 also is connected to the charging receptacle 15 by wires 47.

The electronics package 40 may comprise an integrated circuit chip (not separately shown) constituting the component electronic parts as described below. These components include the audio signal buzzer 45 along with electronic elements that function cooperatively to execute the process steps and operations of the instrument as described in detail below.

To consider the basic outgoing-call operation of the instrument TI, a user simply withdraws the antenna 14 and flips "on" the switch 13 (setting the "active" state C4). With the earphone 20 near the users ear, audible prompts or cues soon are heard instructing the user to respond vocally. Thus, an initial interface is established.

Following preliminary audio communication with the central station (described below), a communication link is completed from the instrument TI to a desired remote telephone terminal. A wireless system network and the public switched telephone network accommodate such operation simultaneously for a multitude of individual wireless telephone instruments, as the instrument TI.

Generally, it is noteworthy that various forms of wireless systems are well known in the art into which the developments hereof variously may be incorporated. In that regard, various function units or processors may be variously combined, utilized, programmed or otherwise rendered functional to accomplish the operations as detailed herein. Also, various forms of dial-up networks have been proposed to which systems in accordance herewith may readily be added.

Referring now to FIG. 3, a plurality of individual wireless telephone instruments TI1 through TIn are represented (FIG. 3, left). The instruments TI1–TIn may take the physical form of the instrument TI as described with reference to FIGS. 1 and 2. Essentially, the instruments TI1–TIn ultimately are interfaced with a public switched telephone network N (FIG. 3, lower center) through central wireless stations C1–Cn and a server S. Of course, the public switched telephone network N also is coupled to (or includes) a multitude of other telephone terminals as generally represented by terminals S1 through Sn. As known in the art, any of a wide variety of couplings may be utilized to selectively accomplish the connective functions of the disclosed system herein, through a wireless network and the public network N to the terminals S1–Sn.

Generally, the stations C1 through Cn function in cooperation with the instruments TI1 through TIn in accordance herewith. For example, the stations C1–Cn may serve as base radio stations for different geographic areas and may be managed by the server S to accommodate roaming by the instruments TI1–TIn as well known in the art. Details of the wireless management and server functions are well known and consequently are not treated here in any detail. However, note that the server S may be replicated and that various of the wireless and conventional telephone functions may be performed either in the central stations C1–Cn or in the server S, depending on specific system architecture and design criteria.

Again, in a preliminary manner, consider a routine operation of the system (FIG. 3) by assuming that a proper user of the wireless telephone instrument TI1, is located in an area served by the central stations C1 and wishes to communicate with someone at the telephone terminal S1, identified by the telephone number 1 213 555 6262.

The user sets the state "active" by moving the switch 13 to the "on" position, and withdrawing the antenna 14 (FIG. 2). Certain identification signals are transmitted from the instrument TI1 (FIG. 3) as to the central station C1. Note that other central stations, as the station Cn, also may become involved if the user of the instrument TI1 roams.

During preliminary processing, as described in detail below, the caller and the instrument are verified as proper and the caller is cued for a called number, e.g. "You have a credit of sixty-eight dollars. Please speak the numerals of the number you are calling".

Responsively, the user speaks the called number digits, e.g. "one, two, one, three, five, five, five, six, two, six, two", designating the terminal S1.

Typically, the user then hears a ringing signal, as presumably a wireless connection is established and communication proceeds in the conventional manner. The communication is monitored to reflect time and charges for the call. Incoming calls also are monitored as treated in detail below.

Generally, some aspects of the system of FIG. 3 are well known, for example, identification methods, broadcast techniques and structures, authentication techniques, calling processes, cellular organizations and mobility managements all are well known. Accordingly, such elements are not treated in detail. However, detailed descriptions of such aspects of mobile telecommunications are provided in a book entitled, *Mobile Telecommunications Networking*, by Michael D. Gallagher and Randal A. Snyder, McGraw Hill, 1997, ISBN 0-07-063314-2, incorporated by reference herein. Particularly, the book treats techniques for interfacing a plurality mobile stations or instruments (through base stations) with a public switched telephone network. Generally as disclosed herein, the central stations C1–Cn can be related as base stations to function with the server S which, as stated above, may embody various wireless network structures.

Regarding another aspect of mobile telecommunication, specifically fraud prevention, though prior techniques are known, some combative developments are provided in the system hereof as described in detail below. Various prior security techniques, forms of which may well be applicable to systems in accordance herewith are disclose, for example, in U.S. Pat. No. 5,541,977 issued Jul. 30, 1996 to Hodges et al. treats a system for the avoidance of wireless fraud. As another example, U.S. Pat. No. 5,450,479 issued Sep. 12, 1995 treats improved security for prepaid systems using telephone calling cards. For other systems, see U.S. Pat. No. 4,922,521, Krikke et al. where identification codes are tested, and U.S. Pat. No. 5,003,595, Collins et al. where approved incoming calls are selected on the basis of automatic number identification signals (ANI) as to access a computer.

To consider the system of FIG. 3 in greater detail, the telephone instrument TI1 (represented as a dashed-line block) shows representations of the earphone 20, the microphone 28, the antenna 14, the switch device 30 the buzzer or tone signal 45, and the power supply or battery pack 38, all as generally described above. Furthermore, as illustrated, the power supply 38 is connected to a control unit 56 through the switch device 30. Otherwise, the electrical elements are connected directly to a transceiver 54. In that regard, the control unit 56 and the transceiver 54 are interconnected by a cable 58.

Generally, the control unit 56 and the transceiver 54 (along with other block elements described below) are contained in the electronics package 40, FIG. 2). The transceiver 54 (FIG. 3) may, in part, take a form somewhat similar to units well known in contemporary wireless telephone systems. Functionally in the embodiment of FIG. 3, both digital and audio signals are transmitted by the transceiver 54; however, only audio signals (essentially vocal) are received and provided directly by the user.

The control unit 56 in the instrument TI includes a memory 56A (ROM) primarily for storing identification data for the instrument along with control data for the control unit 56. Generally, the functions of the control unit 56 (treated below) are relatively simple, involving the transmission of identification signals and sequencing the transmission and receipt of voice signals during interface operations.

As indicated above, the wireless telephone instruments TI1–TIn may utilize currently well-known wireless techniques for communication with the central units C1–Cn. Communication is represented in FIG. 3 by wavy lines L1, L2 and Ln respectively. Such communication is from the antennas 14 of the instruments TI1–TIn through a central station antenna 60 to a wireless telephone platform 62. As suggested, the platform 62 incorporates substantial radio facility and is capable of simultaneously accommodating both wireless and conventional communication, with multiple calls, involving multiple calling numbers from multiple terminals.

The platform 62 is treated in greater detail at a later point herein, however, generally it may take the form of various structures as currently embodied in mobile base stations. The platform 62 is coupled to a processor and control unit 64 serving to process data and control the operation of the central station C1. Functionally, the control unit 64 sequences the operation of components in the central station C1, as disclosed below, and basically accomplishes: screening interfaces, facilitating messages and requests for location or emergency data, recognizing special routing commands, regulating exchanges and generally controlling preliminary interfaces for receiving data and cuing callers. In a broad sense, the unit 64 controls the preliminary telephonic interface with a caller, then may receive/provide information to couple the caller with another remote terminal.

With approval, a call from the instrument TI1 is dialed up through the server S and the network N then bridged from the calling instrument TI1 to the desired terminal, e.g., terminal S1. As indicated, calls are monitored to reflect service charges in the individual pre-paid balances of the wireless telephone instruments TI1–TIn which are kept at the central station C. Also, with approval, as treated in detail below, incoming calls, as from the terminals S1–Sn are bridged to a select one of the instruments TI1–TIn.

To accomplish the control, approval and routing functions of the central wireless station C1, the control unit 64 is coupled to: a voice generator 66 (ARU), a voice recognition unit 68, a memory 70, operator terminal stations 72 (collectively represented) and finally, a network switching unit 74 connected through the server S to the public switched telephone network N.

As indicated above, some components of the central station C1 are well known. Specifically, voice generators are well known as in the form of Automatic Response Units (ARUs) which may include some additional capabilities and are widely used to cue callers in telephonic interface systems.

Voice recognition units, as the unit 68, also are well known and have been developed to a attain a good level of reliably in identifying the spoken numerals "zero" through "nine" in an audio form, even when spoken by different persons and communicated by telephone. For example, verbal recognition units providing an alternative to dual-tone multi-frequency (DTMF) signals are described in U.S. Pat. No. 5,509,060 issued Apr. 16, 1996 to Hall et al. In some embodiments hereof, the voice recognition unit 68 has the further capability to recognize voice signature words when spoken by a certain person.

In the regular interface operation of the present system, essentially, callers are cued by the voice generator 66 to speak numerals ("zero" through "nine") digit-by-digit as explained above. Such spoken numerals are individually recognized at the central station C1 by the voice recognition unit 68 and are provided in a dialing or digital form for use as data or control signals as explained below.

The memory 70, in the central wireless station C1, involves a substantial capacity and includes a digital section 70A and an audio section 70B. In the sections 70A and 70B, individual memory portions (70A1–70An and 70B1–70Bn) for the instruments TI1–TIn respectively are illustrated in FIGS. 8 and 8A, and treated below. For example, the memory portions 70A1 and 70B1 are assigned to the instrument TI1.

In some situations, direct communication with a live operator may be desirable. To accommodate such operation, as described below, a user's call can be transferred to a live operator at one of the terminals 72. Generally, the operator terminals 72 include a display screen for advising the operator of an instant situation ("screen pop") to the extent of stored data.

The network switching unit 74 is a dial-up apparatus for operation with the server S to interface the network N. Accordingly, calls are placed or routed through the network N to a select one of the terminals S1 through Sn. The unit 74 operates with the control unit 64 and various forms thereof are well known.

To elaborate on the form and function of the wireless platform 62, note that the platform 62 accommodates several calling numbers in addition to the verbalized calling number received from the wireless terminals TI1–Tin. In the disclosed embodiment, the following exemplary calling numbers may be used to access the platform 62 to accomplish various communications or operations by the system.

| Called Number | Source | Ultimate Function |
| --- | --- | --- |
| (213) 555 6262 | TI1 | Routine call, e.g. to the terminal S1 |
| (213) 555 9876 | TI1 or S1 | Call to increment pre-paid balance |
| 3333333333----- | TI1 | Connect to operator |
| 4444444444----- | TI1 | Call to learn TI1 backup number data |
| "Home" | TI1 | Call home |
| (213) 555 1212 | S1 | Call the terminal TI1 |
| (213) 555 9976 | S1 | For reporting location of the terminal TI1 |

Note that each of the called numbers designated from the wireless instrument TI1 are provided numeral-by-numeral as spoken words. After preliminary processing, calls from the instrument TI1 are simply routed to the called number, e.g. the terminal S1.

The calling number to increase the pre-paid value for the wireless instrument TI1 is (213) 555 9876. Dialing that number enables the caller to increase the pre-paid balance, as by using a credit card, as will be treated in detail at a later point.

The dialing of the emergency code, ("3333333333 - - - ") again by voice, results in a signal from the platform 62 (FIG. 3) to the control unit 64 which is recognized by the unit 64 to indicate an urgent desire to speak with an operator. Accordingly, the user at the terminal TI1 is bridged to one of the operator terminals 72.

Somewhat similarly, a spoken series of 4's ("4444444 - - - ") is universally recognized as a command (usually by other than the instrument owner) to obtain information on the owner or the instrument. For example, in case of a lost instrument, the owner can be contacted. Also, in the event of an automobile accident, consider the possibility that the driver is unconscious and a wireless instrument in accordance herewith is located in the automobile. A police person, or other, could employ the universal "4's" command to receive a telephone number for next-of-kin. Alternatively, the system may dial-up a next-of-kin number directly and bridge to the instrument TI1, without disclosing any telephone number to the caller at the wireless instrument.

Additionally, the central station unit 64 (FIG. 3) is capable of recognizing certain spoken words from the instrument TI1 to command a select dial-up operation, for example, the word "Home". Such words are stored individually for the user of each specific wireless instrument.

To reach the wireless instrument TI1, the dial-up number is (213) 555 1212, as indicated above. At the central station C1, calls to such a number are first tested to avoid "wrong numbers" then depending on the state of the called instrument are either bridged to the instrument, or a message format is activated. In that regard, various systems and techniques are well known in the field of telephonic message operations. For example, U.S. Pat. No. 4,371,752, issued Feb. 1, 1983 to Matthews et al. relates to telephonic message operations.

Other numbers, dialed up from remote terminals, e.g. terminal S1, accomplish other operations. Specifically, in the disclosed embodiment, reports from the central station C1 are available to an approved caller detailing the recent operating locations of the instrument TI1.

Figure 4:
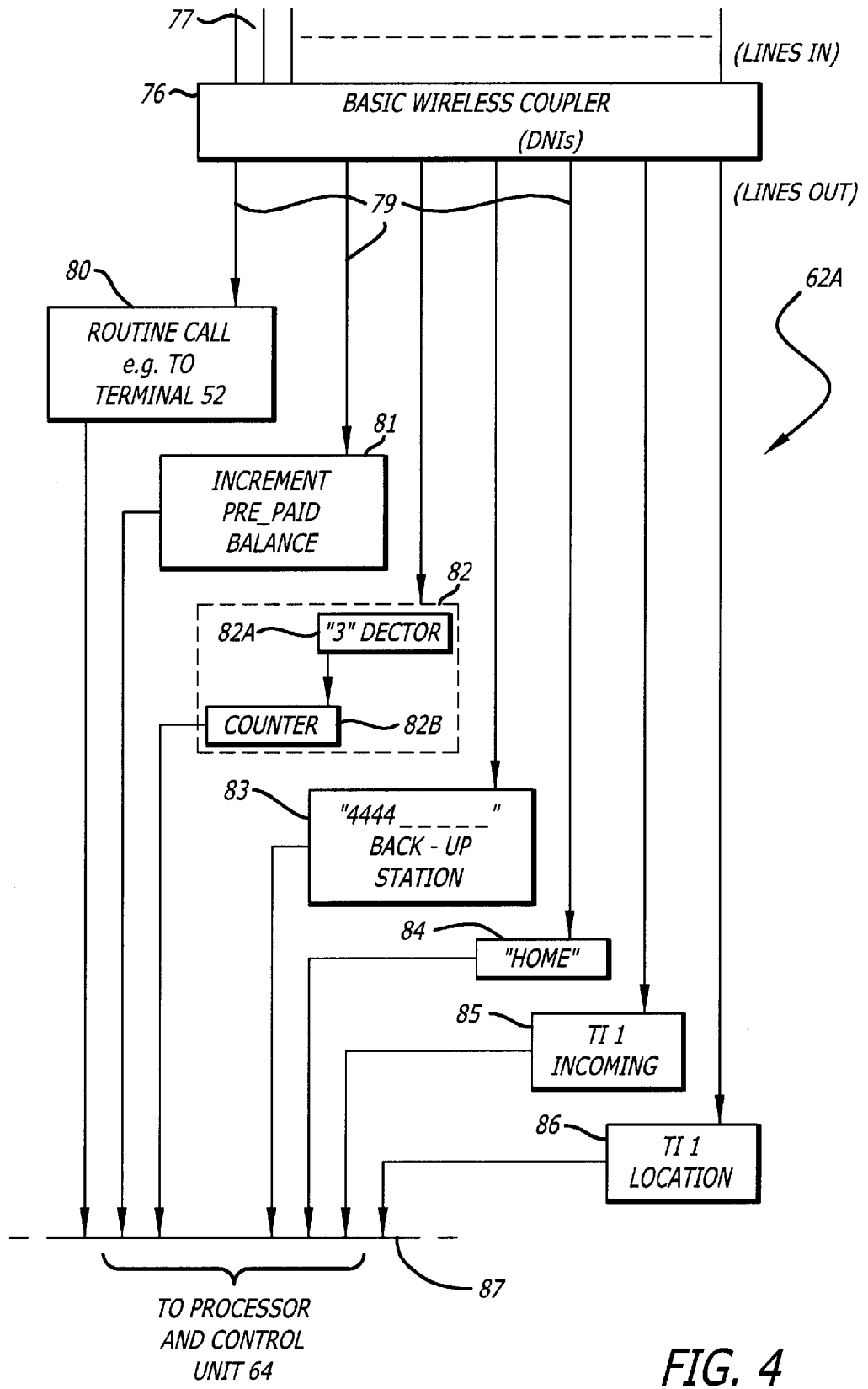
FIG. 4 is a block diagram of a component of the system of FIG. 3.

The various calls as indicated above initially are processed through the wireless platform 62 (FIG. 3). A portion 62A of the wireless platform 62 is shown in FIG. 4 indicating several ports from the radio interface (not shown) which ports are variously coupled to accomplish specific programs or operations in accordance with called numbers. In that regard, DNIS, or other forms of called number identification, function to select a desired process, program or operation, as well known in telephone systems. In a sense, the wireless platform 62 incorporates a basic wireless coupler 76 (FIG. 4) that functions somewhat as a crossbar to access the individual processes through lines 79. Of course, numerous of the incoming ports 77 can access any of the programs of lines 79 simultaneously.

To consider the platform structure in greater detail, in FIG. 4, individual processes, programs or operations are illustrated by individual blocks. For illustration purposes, individually-represented blocks represent processors 80 through 86 to accomplish the listed functions. In that regard, note that the operations attendant the functions can be variously allotted between the platform 62 (FIG. 3) and the unit 64. Also, it is noteworthy that allocation between individual units, locations and components may vary widely within systems embodying the present developments. However, for purposes of explanation, the separate processors 80 through 86 are shown for the functions as will now be described preliminarily.

The processor 80 (FIG. 4) executes routine calls from the instrument TI1. As indicated, the processor 80 interfaces with the unit 64 (FIG. 3) through a common junction 87. Accordingly, in cooperation, the processor 80 and the unit 64 may sense spoken numerals to test calls then provide dialing signals, e.g. DTMF or digital signals to actuate the network switching unit 74 (FIG. 3) and accordingly attain the desired telephonic connection.

The processor 81 (FIG. 4) cooperates with the unit 64) to increment the pre-paid balance for a designated instrument TI1–TIn. When the number (213) 555 9876 is vocalized from the instrument TI1, a value incrementing interface is established involving the voice generator 66 (FIG. 3). A similar interface program is actuated when the pre-paid balance drops below a predetermined level as described in detail below.

A spoken series of the numeral "3", e.g. "33333333 - - - " is detected by the processor 82 which acts with the unit 64 bridging the caller to one of the operator terminals 72 (FIG. 3). As shown, a detector 82A (FIG. 4) for the spoken word "three" provides a pulse to a digital counter 82B which overflows at a count of "eight", for example, to provide a command signal through the common junction 87 to the unit 64 commanding a connection to one of the operator terminals 72.

The processor 83 is similar to the processor 82; however, a series ("44444444 - - - ") of the spoken word "four" is sensed to command the unit 64 to provide a back-up number for the instrument, or dial up and bridge a connection to a station for emergency use in association with the instrument TI1.

The processor 84 exemplifies the one-word dial-up commands, as for the word "home". The processor 84 detects the spoken word to function with the unit 64 and drive the unit 74 to bridge or otherwise attain the desired connection.

The processors 85 and 86 accommodate incoming calls for the instrument TI1 and involve rather detailed logic. The structures and the related operations for these processors are treated at a later point, after treating outgoing calls from the instrument TI1.

Figure 5A:
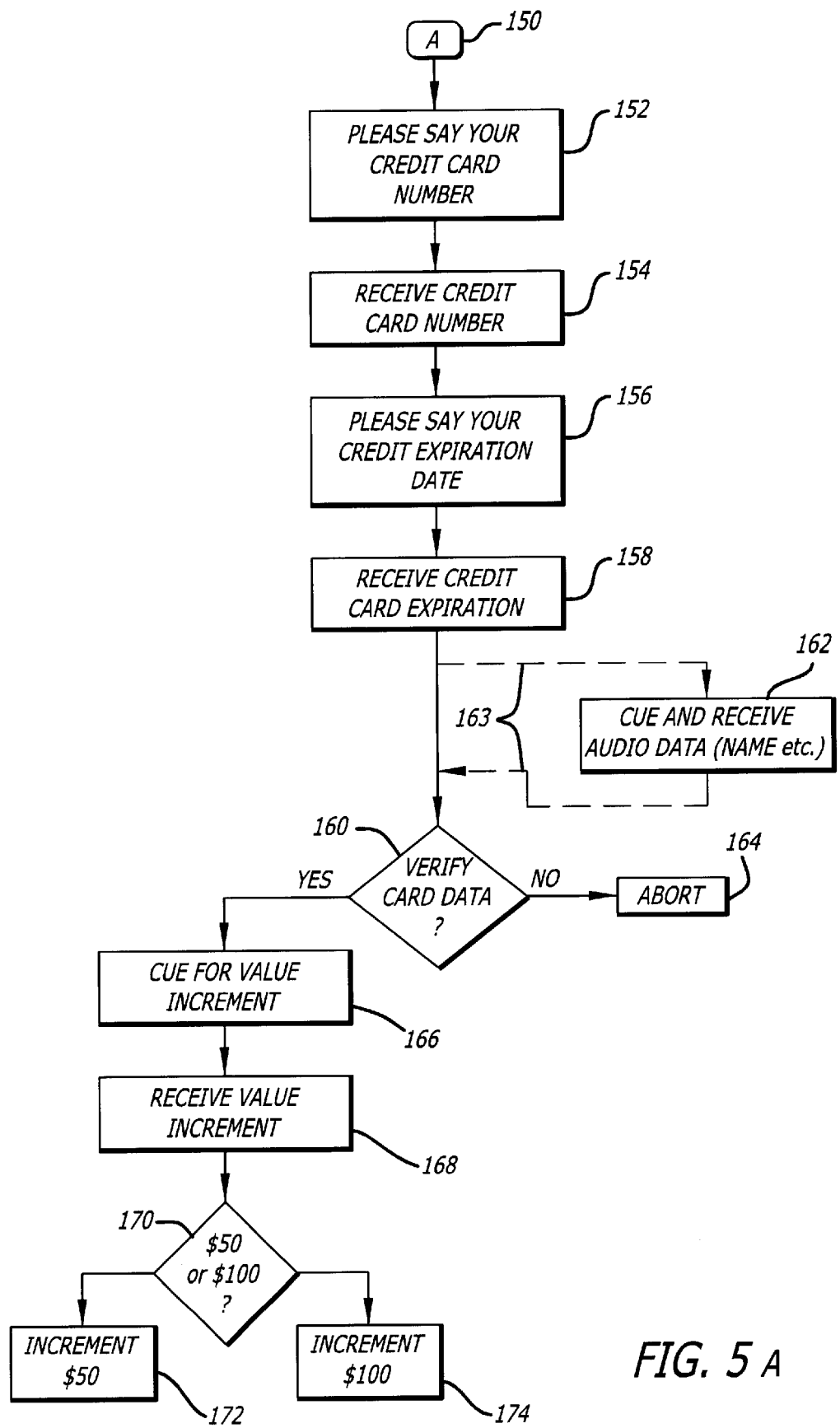

In view of the above descriptions, to further an understanding of the developed composite wireless system and some of the related operating processes, an assumed operating sequence for an outgoing call will now be explained with reference to the various figures including the flow diagram of FIG. 5. Accordingly, assume a proper user, holding the wireless telephone instrument TI1 (FIGS. 1, 2 and 3) and having a desire to establish telephonic communication with the telephone terminal S1 (FIG. 3).

At the outset, the assumed user withdraws the antenna 14 (FIG. 2) actuating the switch device 30 and sets the switch 13 to the "on" position thus placing the instrument in the "active" state. The operation is represented in FIG. 5 by an oval block 90 (upper left), designated "ACTIVE". In such a state, the control unit 56 (FIG. 3, left) fetches the instrument's identification data from the memory 56A then actuates the transceiver 54 to broadcast signals representative of the identification number for the instrument TI1, as indicated by the block 92 (FIG. 5).

Note that in order to indicate the location of origin for each operational step (as between the instrument TI1 and the central station C1) the blocks and symbols in FIG. 4 are designated parenthetically either by a "T" (wireless telephone instrument TI1) or a "C" (central station C1).

At the central wireless station C1, the broadcast identification number from the instrument TI1 is received by the wireless platform 62 (FIG. 3, center) through the antenna 60 and passed to the control unit 64. The operation is represented in FIG. 5 by a block 94.

On receiving the identification number data for the instrument TI1, the control unit 64 (FIG. 3) addresses a data cell 70A1 in the memory 70 storing digital data for the instrument TI1. Details of the format for the exemplary cell 70A1 are treated below with reference to FIG. 8. The addressing step is indicated by a block 96 (FIG. 5). Consequently, the data of the cell 70A1 is readily available. For the present, it is important simply to understand that the control unit 64 fetches reference information or data from the memory 70, i.e., memory cell 70A1, to authenticate or verify that the instrument TI1 is identified.

Somewhat concurrently, the central station C1 monitors the audio for the presence of a series of either "3"s, a series of "4"s or a stored calling word, e.g., "home", as explained above. As illustrated by a query block 99, if any of these audio representations is received, the system proceeds to bridge calls for treatment as explained above. The absence of such audio representations advances the process to verify the calling instrument TI1 based on instrument identification, as indicated by the block 98. Failure to confirm the identification results in an abort operation (block 102). Otherwise, the process continues.

As discussed in greater detail below, various other authentications or verifications may be involved. Essentially, in the disclosed process, the caller is cued (block 100) or otherwise produces audio which is transmitted to the central station (block 104) to be received and processed (block 106) to enable a test (query block 108). In one embodiment, the user may be asked to speak a group of identification numerals associated with the instrument. A test comparison then validates the instrument user, as well as the instrument. In an alternative form, the user is asked to speak a code word that carries his voice signature. For example, the user may have selected the word "Franklin" as the code word and during preliminary operations the word is spoken several times to produce and store a signature for the user. Thus, the voice recognition unit 68 (FIG. 3) is capable of recognizing the word "Franklin" when spoken by an approved user. Thereafter, each time the instrument is used, the user again speaks the code word which is processed in the unit 64 with the voice recognition unit 68 to confirm identification of the user. Note that other users of the instrument also will be required to establish code word signatures in the memory 70 associated with the unit 64.

In accordance with still another embodiment, the spoken words for certain numerals, e.g., "seven", are signaturized for identification. Consequently, the interface exchange regarding a code word or number is avoided. Rather, the user simply announces the number to be called, numeral-by-numeral and certain of the numerals are "signature" tested against a reference to verify the instrument and the caller. To illustrate this feature, reference will now be made to FIG. 7.

Figure 7:
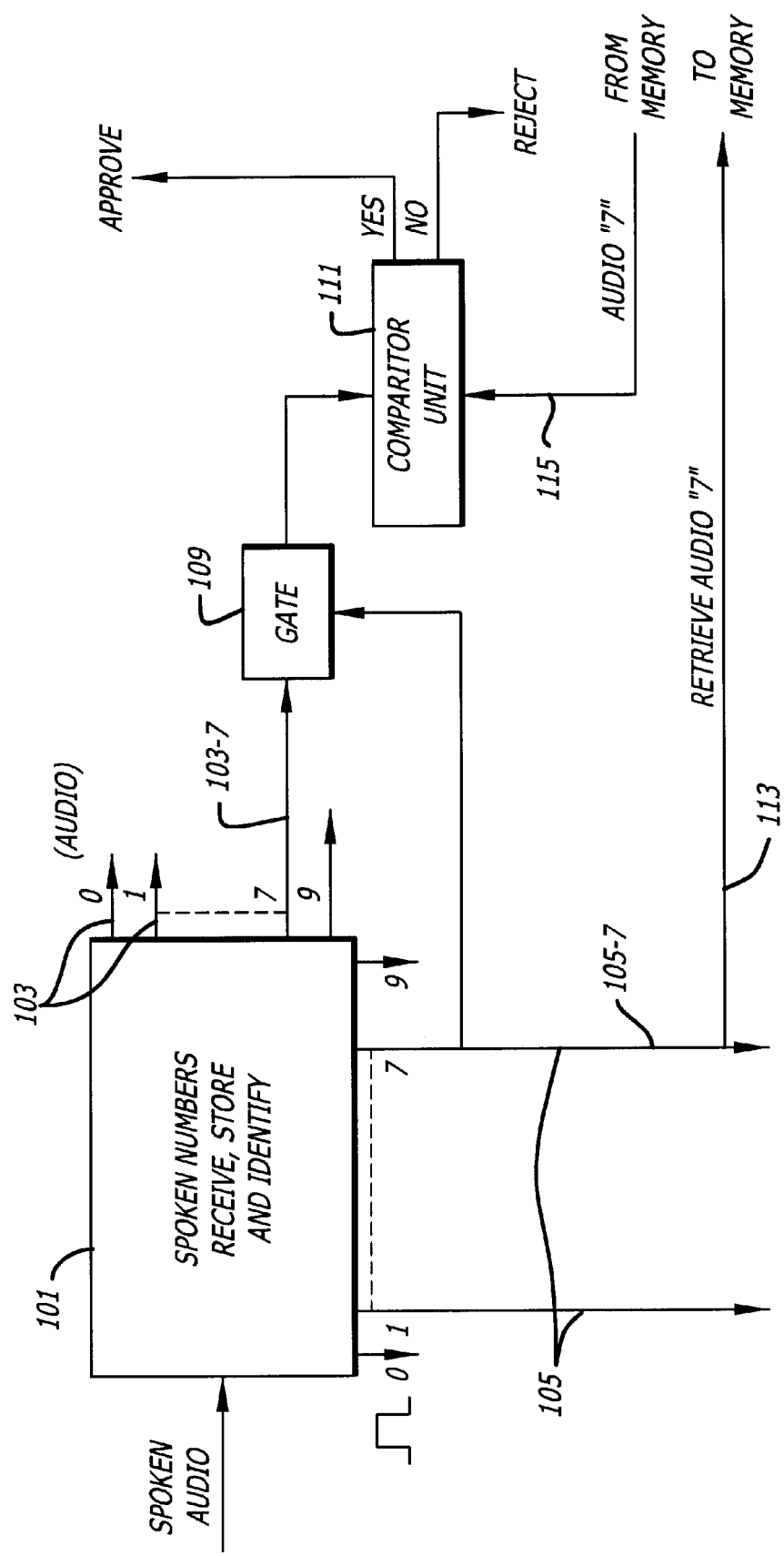
FIG. 7 is a block diagram of a component that may be employed in the system of FIG. 3.

Embodied within the processor and control unit 64 (FIG. 3) is a capability illustrated in FIG. 7. Audio signals representative of numerals that are spoken into the instrument TI1 are received by a decoder 101 where they are stored and decoded. The decoder 101 provides refined audio representations of the received signals at lines 103 and binary representations for the presence of each of the numerals on a series of lines 105. For purposes of explanation and drawing simplification, only structure for the numeral "seven" is shown an described. An audio representative signal for the numeral "seven" appears in the line 103-7 and a binary indication appears on the line 105-7.

The presence of a binary signal on one of the lines 105 indicates the presence of a specific spoken numeral, e.g., line 105-7 indicates the presence of the numeral "seven". Depending on the configuration of the system, certain numerals, e.g., "seven", are selected for signature testing. To illustrate the operation, only the numeral "seven" is treated, however, various, or all numerals could be used. Generally, enough numerals must be used to statistically assure the presence of at least one signature numeral in any telephone number.

On the occurrence of the spoken numeral, e.g., "seven", a binary signal on the line 105-7 qualifies a gate 109 to pass the audio-representing signal in the line 103-7 to a comparator unit 111. Thus, a test signature signal is provided for testing against a reference signature.

The binary signal in the line 105-7 also fetches a reference "seven" signature signal from the memory 70 (line 113) for comparison with the represented test signature signal just received for the numeral "seven". Specifically, a reference signature signal is provided from the memory 70 (FIG. 3) through a line 115 to the comparator unit 111. In the event of a coincidence, the call is approved as verified (FIG. 5, block 108). Otherwise, the call is rejected, as with and "abort" message as described (block 110).

If the call is verified as proper, verification ("yes", block 108, FIG. 5) advances the operation to a block 112 to initiate another testing step in the process. Specifically the control unit 64 (FIG. 3) determines whether the wireless telephone instrument TI1 has at least a critically-low pre-paid balance.

To perform the step, the control unit 64 again addresses the data from the memory cell 70A1 for the instrument TI1 to obtain the current pre-paid credit or value held for the instrument (block 112). If the balance is critically low, the user may wish to add value, as by using a credit card.

The step of the query block 114 (FIG. 5) tests for a critical pre-paid balance that is available for calls, e.g. "balance over five dollars?". Note that although values are treated in terms of dollars herein, such values are merely exemplary, recognizing that points, credits, and so on could be used to designate value.

In any event, the control unit 64 tests the current value against a critical minimum value, e.g. five dollars, to determine whether or not to inquire if the user wishes to increase the pre-paid value of the instrument. If so ("no", block 114) the user might be cued: "Your instrument now has a value balance of only four dollars and fifty cents, if you would like to increase the value by using a credit card, please say 'one'". The query is represented by a block 116.

The query is resolved by the user's command, as illustrated by the query block 118. If the user wishes to increase the prepaid balance, the process advances to a sub-process as indicated by an oval block 120 (detailed below with reference to FIG. 5A). Otherwise, the process moves to another query block 122 representing another "test" step executed by the control unit 64 (FIG. 3). Specifically, the query is whether the instrument TI1 has sufficient current calling value to permit any call. If not, an abort is commanded as indicated by an abort block 124.

If the instrument has some significant value, i.e., an amount in excess of some minimum call value, the process moves to the step of block 126, which also represents the step that follows a positive result from the test block 114 ("balance over five dollars?"). With the process advanced to the step of proceeding with a call, the block 126 represents cuing the user for the called number ("1 213 555 6262" for terminal S1). Additionally, the user is given the current pre-paid value for the instrument.

Specifically at this stage, the control unit 64 (FIG. 3) controls the voice generator 66 to cue the user. For example, the audio message transmitted to the user might take the form: "The present value of your instrument is sixty four dollars and fifty cents, please speak the number you are calling, digit by digit."

At the instrument TI1, the user speaks the desired number to be called, e.g. "one, two, one, three, five, five, five, six, two, six, two." The spoken words impact the microphone 28 (FIG. 3) and are converted to audio signals that are broadcast by the transceiver 54 using the antenna 14. See FIG. 5, block 126.

The transmitted audio signals representative of the called number are received (FIG. 5, block 128) at the wireless central station C1 (FIG. 3) by the platform 62. Applied to the control unit 64 through the processor block 80 (FIG. 4) the signals are converted to a dialing form then applied to the network switching unit 74 to accomplish a dial-up operation through the server S and the public switched telephone network N.

Using the multitude of capabilities and structures of the public switched telephone network N, a connection is sought with the terminal S1, see block 132, FIG. 4. Normally, the user would hear a "ringing" tone and the connection would be established. It may be the policy that the call would be charged only if communication is established. Accordingly, a query block 134, is illustrated. If the connection is not established, which might be determined by the user inactivating the instrument TI1, operation is aborted (block 135) with no action necessary. Alternatively, a message format may be initiated for the central station C1 to receive a message for subsequent transmittal to the terminal S1.

If a connection is established (block 134, yes), the bridge between the instrument TI1 (FIG. 3) and the terminal S1 is completed with monitoring to determine charges for the call as indicated by the block 136. When the communication is terminated, the time and charges for the call are reflected in the prepaid balance as stored in the memory cell 70A1 for the instrument TI1. These operations are executed between the control unit 64 and the memory 70.

Thus, in summary, FIG. 5 illustratively describes the process that is cooperatively executed by the platform processor 80 (FIG. 4) and the control unit 56 (FIG. 3) interfaced with the wireless telephone instrument TI1.

As indicated above, another operation for outgoing calls involves incrementing the pre-paid balance. The operation may be initiated as a result of a specific call to a designated calling number, or when selected as an option as described above with reference to FIG. 5. The logic will now be treated with reference to FIG. 5A.

Essentially, the operation is to add value to the prepaid balance of the telephone instrument TI1, by incrementing the value stored in the memory cell 70A1. For example increments of either fifty or one hundred dollars might be selected.

The selected increment of value is reflected in the balance stored at the central station C1 (home station for the instrument TI1) and may be supported by a conventional credit card. In that regard, to support the credit card transaction, limited data (credit card number and expiration date) may be sufficient. However, it is common practice additionally to require the card holder's name or other data. As disclosed below, such additional data may be communicated in the form of audio signals representing words spoken by the user. Essentially, the control unit 64 accommodates recording such audio information in the audio memory section 70B.

Considering the subprocess in detail, an oval 150 (FIG. 4A, top) designated by an "A" indicates the start. The initial step (block 152) of the sub-process involves cuing the user to state the number of the credit card for supporting the increment of value. As described above, the number is spoken digit-by digit to be received, in audio form, at the control station C1 (block 154). As described above, the resulting audio signals may be converted to digital or other representations for storing or further processing. Comparison tests may be performed as described.

In a similar fashion, the user is cued by the voice generator 66 to speak the card expiration date (block 156). Again, as described above, the date is spoken and received as audio signals then stored and processed as illustrated by a block 158.

Unless the process encompasses taking alphabetic data, e.g. the user's "name", "address" and so on, the next step involves a query as indicated by the block 160. If alphabetic data is to be taken, a block 162, indicated as an alternative step by a dashed-line path 163, involves cuing, receiving and distinctly recording or processing such data, again in the form of audio signals. Rather than being converted to numeric representations, the audio signals representative of alphabetic words may be stored in the memory section 70B for processing which may involve subsequent consideration by a person.

In any event, the process next advances to the query block 160, indicating a test executed by the control unit 64 (FIG. 3) to verify the received data. If the data is only digital, verification typically would be on line. With verification, the transaction is approved. Otherwise, the process advances to a block 164 (FIG. 5A) indicating an abort of the communication.

Proceeding along the "yes" path from the query block 160, the next step is to cue the user for the value increment, e.g. "$50" or "$100"? The step is indicated by a block 166 and involves the user either speaking the digit "one" for a "$50" increment, or the digit "two" for an increment of "$100".

The spoken increment digit is received, as indicated by a block 168, converted to digital signals and depending on the selected option is processed by recording the increment. The operations are illustrated by a query block 170 and the alternative incrementing blocks 172 and 174 whereby value is added to the prepaid balance. Thus, the final step is executed by the control unit 64 (FIG. 3) and the memory 70. Specifically, the memory cell 70A1 stores the prepaid value of the instrument TI1, which is thus incremented by the selected increment amount.

The above explanations have primarily discussed exemplary outgoing calls from the instrument TI1. However, as indicated above, incoming calls are also accommodated. To recapitulate, incoming calls are taken when the instrument is in the "standby" state C3. Recall that in the "off" state C1 no action occurs. In the "active" state C4, a call is in progress with message formats invoked and in the "pager" state C2, conventional pager operation is scheduled.

The logic for incoming calls is set forth in FIG. 6, and will now be treated in detail. The presence of an incoming call to the instrument TI1 is represented by a block 151. The call is received by the wireless platform 62 (FIG. 3) for preliminary processing. Wrong numbers and other unwanted calls are screened for the instrument TI1 by the unit 64 which functions in that regard with the memory 70 as will now be explained. Note that wrong numbers and other unwanted calls are particularly annoying for wireless instruments.

A positive list of approved calling numbers is stored in the memory section 70A as disclosed in detail below. Accordingly, the automatically provided telephone number (ANI) of the calling station is compared with approved numbers on a list in the memory cell 70A1 for the instrument TI1. The test or comparison is represented in FIG. 6 by a query block 153 and involves scanning the list of approved numbers for a match with the calling number (ANI).

If a match does not occur ("no" path from the block 153) there may be a possibility that the caller is approved; however, is not calling from a home station. Consequently, the system prompts the caller (block 155) for an approved number. For example, the prompt might take the form: "If you are not calling from home, will you please enter your home telephone number".

If the caller enters another number, it is tested as indicated by the query block 157, e.g., does the entered number coincide with any number on the approved list? If not, the operation proceeds to an abort operation as represented by the block 159. Typically a message would be given, for example: "The number you have called is not accessible to you at this time. Thank you."

If the calling number is approved, as a result of the either of the steps illustrated by blocks 153 or 157, the operation proceeds to determine whether the instrument TI1 is in a "standby" state, i.e., state C3. The determination is represented by a query block 161 in FIG. 6.

When the instrument TI1 is in a standby state C3, ("yes") the buzzer 45 (FIG. 3) is actuated providing an audible sound to signal the call. Of course, the possessor of the instrument TI1 may or may not "pick-up" (query block 163) by turning on the switch 13 (FIG. 1). If the call is taken ("yes" from the block 163) the instrument is placed in an "active" state C4 and the call is bridged from the central station C1 (FIG. 3) as indicated by the block 167.

If the call is not taken (switch 13 not turned "on"), or if the instrument TI1 is not in a "standby" state ("no" from block 161) the operation proceeds to a block 169 initiating a process for capturing messages. A1 illustrated, the central station C1 cues the caller with a query, e.g., "Your call can not be connected at present, if you wish to leave a message. please touch '1', otherwise, hang up" (block 169).

The process then proceeds to a query block 171 for the determination of whether the caller wishes to leave a message. If a message is not to be left, the process is ended as indicated by the block 179.

If it is desired to leave a message, the caller is prompted as indicated by the block 173, e.g., "Please begin your message now and touch the pound sign key when finished, then hang up."

The audio message is captured in the memory section 70B1 using conventional recording techniques as indicated by the block 175. Also the message flag is set in the memory section 70A1 as indicated by the block 177. Consequently, anytime the instrument TI1 is again set in a "standby" state C3, the buzzer 45 in the instrument TI1 will be actuated to indicate a need to communicate a stored message.

The process for delivering messages is also diagrammed in FIG. 6 and will now be considered beginning at the stage labeled "to receive" (FIG. 6, center right). The system monitors for the existence of a flag for the instrument TI1, continually poising the query, "is the flag set" as indicated by a query block 180. If the flag is not set for the instrument TI1, the logic is not further involved as indicated by the terminate block 182. However, when a flag is set, the process monitors the instrument for an entry into the "standby" state C3, as indicated by the block 184. If that state does not occur (query block 186) the monitoring simply continues. However, with the occurrence of the "standby" state, as indicated by a "yes" from the query block 186, the instrument TI1 sounds the buzzer 45 (block 187) to alert the holder, then proceeds to the next test, as represented by a query block 188.

The next query is: whether the holder of the instrument TI1 picks up. If so, the message is given (block 190) and the flag is cleared. Note, that the system may be implemented to enable the holder to override the message. If there is no "pick-up", after a reasonable delay (block 192) the system returns to the monitoring operation of block 184.

As indicated above, signal messages also may be provided in accordance with a pager operation when the instrument is in the "pager" state C2. Essentially, in that state, a holder of the instrument is signaled to call for a message.

As indicated above, in accordance with another feature, the geographic location of the instrument TI1 can be tracked by an authorized authority using a proper telephone or being capable of identifying a proper telephone dialing number. Essentially, each time the instrument TI1 communicates with a central station, e.g., the central station C1, a record is made in the memory 70 of the instrument's geographic location. For example, the memory might maintain a record of the last five locations of the instrument. An approved caller may then call the central station C1, e.g., using the number "(213) 555 9976" as indicated above to access the processor 86 (FIG. 4) for a location report. Approved callers may be identified by automatic number identification (ANI) or the like, and by personal identification numbers if desired. With proper identification, a caller is provided a location report by correlating the location data from individual central stations C1–Cn to the extent necessary.

The location tracking feature is desirable for a variety of applications. For example, it may be important to track the locations of an instrument used by a child. Also, a central office may wish to track the locations of traveling personnel with respect to their use of a wireless telephone instrument. In that regard, location data in the memory 70A is simply converted to audio signal representations by the unit 64 which drives the voice generator 66 to announce the location information.

Repeated reference has been made to the memory 70 in relation to various operations. In that regard, individual memory portions are provided for each of the wireless instruments TI1–TIn. In that regard, depending on system design, regulatory provisions and operating formats, the content of the memory 70 may vary to a considerable extent. Regarding the audio memory 70B, typically, digital recording also will be utilized. However, in that regard, messages and the like are simply recorded and utilized in accordance with well known techniques in the art. Specifically, flags and designations may be used to indicate audio for various purposes. In any event, an exemplary format for the memory section 70A1 (digital) is treated below and may typify each of the other sections for individual instruments.

FIGS. 8 and 8A show the memory portion 70A1, for the instrument TI1 which typifies the memory portions for each of the telephone instruments TI1–TIn. As indicated above, stored data includes an identification number, for example, "2746832814" for the instrument TI1. Recognizing that instruments in accordance herewith may be treated somewhat differently in various systems, it is to be recognized that the indicated number is merely illustrative and conventions, regulations and so on may command identification numbers or data in totally different forms in view of considerations as set forth in the above-referenced book. Again, a detailed treatment of identification numbers for mobile instruments or stations is provided in the book, Mobile Telecommunications Networking, specifically in a section beginning on page 64.

Recapitulating, with activation of the instrument TI1, its identification number is transmitted (broadcast) from the instrument TI1. On receipt at the central station, e.g., central station C1, the number is used by the processor and control unit 64 to address the memory section 70A and accordingly locate a specific memory portion, e.g., portion 70A1 for the instrument TI1. Thus, memory portions are addressed individually by the identification numbers as illustratively represented by an arrow 191 in FIG. 8 (upper left).

The exemplary memory cell or portion 70A1 includes a number of individual fields shown horizontally arranged in FIGS. 8 and 8A. At the top of the section 70A1 (FIG. 8), a field 193 stores the identification number ("2746832814") for the instrument.

Next in order, a field 194 may register the instrument code, specifically a four digit number, e.g., "2139". In one embodiment, the field 192 provides a reference for verification of the user. Alternatively, the field 192 may store an address for a code word signature or a numeral signature to verify a user as explained above.

A pair of related fields 195 and 196 respectively store the current and last prior prepaid values of the instrument TI1. The current value, e.g., $68.50 is used for authorizing use and is reported to the user. The prior value is accessible to an operator, as by "screen pop" techniques, or selective addressing, along with all fields of the section for reference purposes, as at one of the operator terminals 72 (FIG. 3).

A series of similar fields 198 (FIG. 5) are collectively identified and store a record of the calls made by the instrument TI1. The fields 198 may be organized as a transient memory for some predetermined number of calls that were made most recently. For example, only the last twenty calls might be stored. Designation or target telephone numbers are illustrated for the three last calls made from the instrument TI1. Dates also may be recorded.

Another series of similar fields 200 also is collectively represented and provides a record of refreshed value increments. Specifically, incremental values and dates for adding value to the prepaid balance are stored as shown. Again, the storage may be transient covering some predetermined number of prior occasions.

As previously suggested, the system can receive and report messages via the instrument TI1. In that regard, messages are delivered only at a time when a telephone instrument TI is in a "standby" state. Messages, in the form a telephone calling number and a date, are stored in a group of memory fields collectively designated as fields 202. These fields may be flags correlated to audio data as held in the memory 70B as by access addresses.

The next field 204 relates to limitations imposed on outgoing calls. Accordingly, this feature involves limitations that may be imposed individually on each instrument TI, for example on the use of the wireless telephone instrument TI1. Some examples will explain the feature and its operation.

One potential widespread use of instruments in accordance herewith is by young students as in elementary school. With the defined risk of loss, the convenient physical form of instruments hereof, and the simple operation, parents may wish to provide instruments to their children both for security and routine communication. To further limit the risk attendant such instruments, in accordance with a feature, use limitations can be imposed on the instruments.

Pursuing the example of a young student as the user, it might be expected that proper use of the instrument TI1 would be restricted to a single destination dialing area. Accordingly, the use of the instrument can be so limited by storing the area code or codes that are approved for calls. Such limitations are stored in a group of fields 204 (FIG. 5) and are employed to test outgoing calls for the instrument. Such tests may be executed similarly to other outgoing tests as explained above. For example, the flow diagram of FIG. 5, would be modified simply by incorporating a further verification step similar to that of the block 108 (FIG. 5). Thus a test or tests would be performed by the processor and control unit 64 (FIG. 3) as a part of the step represented by block 128 ("receive and process call number"). The test would check the called number (or other limitation data, as time) against the reference area code numbers (or other control data) stored in the fields 204 (FIG. 8).

As suggested, another limitation may be based on the time of day when calls can be made. For example, the day (twenty four hours) might be divided into four segments of six hours each called: "morning", "day", "evening" and "night". The instruments TI may then be restricted for use to any one or more of the segments. For example, an employee given the instrument TI1 might be restricted to using it only during the segments designated "morning" and "day". The approved six-hour segments are stored in the fields 204 and are imposed by verification processing in the control unit 64 (FIG. 3). For example, such a time verification may be a part of the test process step 108 (FIG. 5).

Generally, attempted use of the telephone instrument TI1 that is outside the imposed limitations will be aborted in favor of a brief denial message. Thus, the risk of loss from clones or lost instruments is further reduced.

Returning to consideration of the memory section 70A1 (FIG. 8) a group of fields 206 store various personal and statistical data on the assigned owner or user. Again, such information is available to be displayed to an operator. Often such data will be useful in communicating with users, as in the cases of interrupts or abort situations. Emergency data may be included, as for example, the home telephone number of a young person or that of a specific medical facility.

FIG. 8A shows a continuation of the memory section from FIG. 8 with a group of fields 212 to store area codes or other equivalent geographical indications of communications by the instrument TI1. The data is processed to provide location reports as explained in detail above. A related set of fields 214 identify calling stations that are approved for receiving location reports. Thus, as illustrated, the terminal S3, with a calling number of (714) 555 6174 is authorized to call for a location report. As indicated above, a personal identification number also may be required.

A group of fields 216 correlate spoken signature words from the instrument TI1 to a specific terminal to be called. As illustrated, the spoken word "home" is identified to locate the number (213) 555 6791 which is the home number for the assigned user of the instrument TI1. Basically, a number representation of the word "home" is stored (as in the memory section 70B) to locate the number to be called or dialed up. Consequently, when the word "home" is spoken at the instrument TI1, it is processed to retrieve the desired number from one of the fields 216. The retrieved number is then dialed and bridged, as by the network switching unit 74 (FIG. 3).

In view of the detailed descriptions set out above, the structure and operation of the system to execute effective communication processes will be apparent. However, a few additional comments may be appropriate in relation to various applications of the system. The case of a young student was considered above and is here emphasized in the interests of security and communication. Telephones are often unavailable when most needed and in the case of young people, the need may be extreme.

The same features that render an instrument hereof to be suitable for a young person also are present for numerous other applications. Specifically, reduced risk of loss, minor complications of ownership and considerable convenience for storage render such instruments practical for travelers, automotive use, employee assignment, pager users, and a host of others.

To consider the procurement of the instrument, a purchaser might take delivery with only minimal formality. Essentially, the instrument would be given an identification number and an instrument code, both being stored in the memory 56A (FIG. 3) and a related one of the cells 70A1–n. A prepaid amount would be paid and recorded in the assigned cell. Various owner data also may be required and stored in the group of fields 206 (FIG. 8). Note that such data might be stored during an interface operation with an instrument TI. Otherwise, complications are minimal. The owner is not obligated for unlimited calls. Credit information or standing is unnecessary. Billing details are avoided. The complications of acquisition are relatively few. The convenience is relatively good and the risk of loss is relatively small.

In view of the above explanations of exemplary systems, processes and features, it will be apparent the other embodiments and processes may be employed utilizing the developments hereof. Accordingly, the proper scope hereof is deemed appropriately determined on the basis of the claims as set forth below.

What is claimed is:

1. A wireless telephone system for use with wireless telephone instruments individually prepaid for limited use, and which transmit an identification signal on activation, said system for enabling telecommunication from calling wireless telephone instruments to access other target telephone terminals through a dial up network, said system comprising:

a voice generator for providing vocal cues;

a voice detector for translating voice signal representations to dial-up telephone signals;

a memory for storing data on said wireless telephone instruments including prepaid balances for said wireless telephone instruments;

a platform for interfacing said wireless telephone instruments to: receive said identification signals from said wireless telephone instruments, provide cues from said voice generator to said wireless telephone instruments and receive voice representations from said wireless telephone instruments to provide dial-up telephone signals from said voice detector;

control means for controlling said voice generator, said voice detector, said memory and said platform to interface said wireless telephone instruments through said platform for: identifying a calling wireless telephone instrument, testing said calling wireless telephone instrument for call approval whereby, the prepaid balance for said calling wireless telephone instrument is tested, cuing a caller at said calling wireless telephone instrument to speak a target telephone terminal number, receiving said dial-up telephone signals from said voice detector to dial up the target telephone terminal for an approved calling wireless telephone instrument through said dial-up network in accordance with said spoken target telephone terminal number and reflecting the charge of dialing up said target telephone terminal in a prepaid balance of said memory.

2. A wireless telephone system in accordance with claim 1 wherein said memory includes a plurality of cells for storing data respectively on a plurality of said wireless instruments, said cells including a plurality of fields for storing data, including an identification number, and a prepaid balance.

3. A wireless telephone system in accordance with claim 1 wherein said memory includes a plurality of cells for storing data respectively on a plurality of said wireless instruments, said cells including a plurality of fields for storing data, including an identification number, and a prepaid balance and call limitation data.

4. A wireless telephone system in accordance with claim 1 wherein said memory includes a plurality of cells for storing data respectively on a plurality of said wireless instruments, said cells including a plurality of fields for storing data, including an identification number, and a prepaid balance and call limitation data relating to area.

5. A wireless telephone system in accordance with claim 1 wherein said memory includes a plurality of cells for storing data respectively on a plurality of said wireless instruments, said cells including a plurality of fields for storing data, including an identification number, and a prepaid balance and call limitation data relating to time.

6. A wireless telephone system in accordance with claim 1 wherein said memory includes a plurality of cells for storing data respectively on a plurality of said wireless instruments, said cells including a plurality of fields for storing data, including an identification number, and a prepaid balance and call record data.

7. A wireless telephone system in accordance with claim 1 wherein said memory includes a plurality of cells for storing data respectively on a plurality of said wireless instruments, said cells including a plurality of fields for storing data, including an identification number, and a prepaid balance and prepaid balance refresh data.

8. A wireless telephone system in accordance with claim 1 including means for sensing an emergency code of spoken numbers to command a bridging operation.

9. A wireless telephone system in accordance with claim 8 wherein said emergency code comprises a spoken series of a similar number.

10. A wireless telephone system in accordance with claim 1 wherein said system includes a plurality of operator terminals and said bridging operation bridges a call to an operator terminal.

11. A wireless telephone system in accordance with claim 1 wherein signals representative of spoken words are received by said platform to indicate control data as well as audio communication.

12. A wireless telephone system in accordance with claim 1 wherein said control means selectively provides cues to produce number data and alphabetic data by spoken words and wherein said voice detector translates only said number data to dial-up telephone signals.

13. A wireless telephone system in accordance with claim 12 wherein said alphabetic data is stored in said memory.

14. A wireless telephone system in accordance with claim 12 wherein said certain of said number data translated by said voice detector functions as control data.

15. A wireless telephone system in accordance with claim 12 wherein said certain of said number data translated by said voice detector is stored.

16. A process for wireless telephonic communication to accomplish an interface between a calling wireless telephone instrument and a central station to establish communication by said calling wireless telephone instrument with remote target telephone terminals through a public switched telephone network, comprising the steps of:

interfacing said calling wireless telephone instrument to cue spoken words representative of alphabetic data and numerical data;

receiving spoken word signals from said calling wireless telephone instrument representative of alphabetic data and numerical data;

selectively converting said spoken word signals from said calling wireless telephone instrument representative of numerical data to dial-up telephone signals, including spoken word signals indicating a target telephone terminal;

testing said calling wireless telephone instrument for an adequate prepaid balance to cover charges to said remote target telephone terminals, thereby identifying an approved calling wireless telephone instrument; and bridging an approved calling wireless telephone instrument for communication with a target telephone terminal and monitoring said communication for reflection in said prepaid balance.

* * * * *